(No Model.)

C. HANSON.
TWINE TENSION DEVICE.

No. 578,099. Patented Mar. 2, 1897.

Witnesses
Wm DuVal Brown,
E. C. Catts

Inventor
C. Hanson
By Glascock & Co.
Attorneys

UNITED STATES PATENT OFFICE.

CHARLES HANSON, OF HILLSBOROUGH, NORTH DAKOTA.

TWINE TENSION DEVICE.

SPECIFICATION forming part of Letters Patent No. 578,099, dated March 2, 1897.

Application filed August 26, 1896. Serial No. 603,988. (No model.)

*To all whom it may concern:*

Be it known that I, CHARLES HANSON, a citizen of the United States, residing at Hillsborough, in the county of Traill and State of North Dakota, have invented a certain new, useful, and valuable Improvement in Twine Tension Devices, of which the following is a full, clear, and exact description.

My invention has relation to twine tension devices for twine-binders; and it consists in the novel construction and arrangement of its parts, as hereinafter described.

Figure 1:
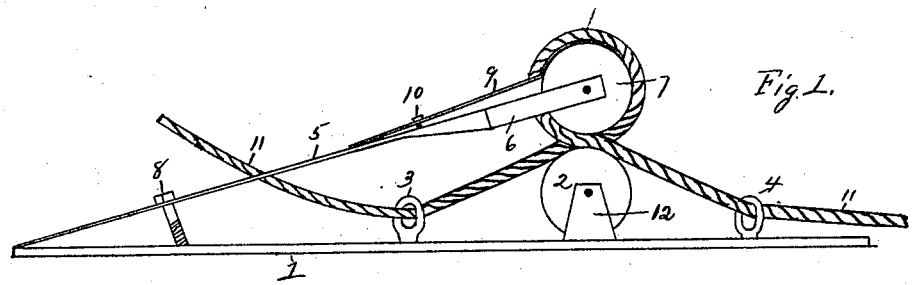
Figure 2:
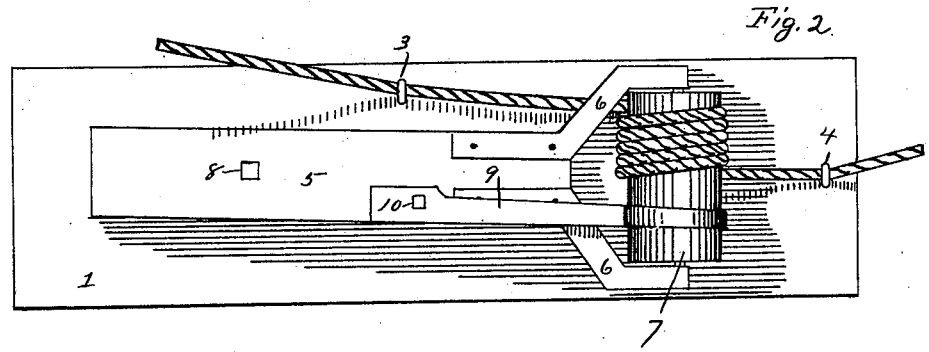
Figure 3:
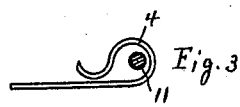

In the accompanying drawings, Figure 1 is a side view of the device. Fig. 2 is a top plan view of the device. Fig. 3 is a side view of an especially-adapted eyelet.

The base 1 of the device is provided with the roller 2 and the eyelets 3 and 4. The roller 2 is journaled in the bearings 12, said bearings in turn being located on the base 1. An inclined section 5 is located on the base 1. Said section 5 is preferably made of spring metal. At the upper end of the section 5 the arms 6 6 are fixed, and between the said arms the roller 7 is journaled. Said roller 7 is opposite the roller 2. The tension of the section 5 may be regulated by the bolt 8, which passes through said section and engages the base 1. The section 5 is provided with the spring 9. The upper end of the spring 9 is curved and is adapted to rest on the roller 7. The pressure of the spring 9 against the roller 7 may be regulated by the bolt 10, which passes through the spring 9 and engages the section 5.

The twine 11 passes first through the eyelet 3, then passes between the rollers 2 and 7 and is wound several times about the periphery of the roller 7, and then passes through the eyelet 4. The two rollers bear against the twine. The pressure exerted by the bolt 8 on the section 5 tends to keep the two rollers as near as possible together. The pressure exerted by the bolt 10 on the spring 9 tends to retard the revolving motion of the roller 7, and as the twine 11 is wound several times about the periphery of the roller 7 there is no possibility of the twine slipping about the periphery of the said roller. Therefore the twine as it is fed to the binding device is kept taut, and by the manipulation of the bolts 8 and 10 the tension of the twine may be regulated to suit the occasion. The eyelet as shown in Fig. 3 consists of a spring-strip formed with a loop, the free end of the strip terminating near the body of the strip.

Having described my invention, what I claim as new, and desire to secure by Letters Patent, is—

A twine tension device consisting of a roller mounted on a base, a spring-section mounted on said base a roller journaled in the said section and playing opposite the first said roller, the twine passing between the two said rollers, a bolt or other device connecting the spring-section and the base and adapted to regulate the pressure of the upper roller; a spring-arm mounted on said spring-section, one end of the said arm bearing against the roller in the spring-section, a bolt or other device connecting said arm and section and adapted to regulate the pressure on the said roller.

In testimony whereof I affix my signature in presence of two witnesses.

CHARLES HANSON.

Witnesses:
W. H. NORMAN,
P. G. SWENSON.